UNITED STATES PATENT OFFICE.

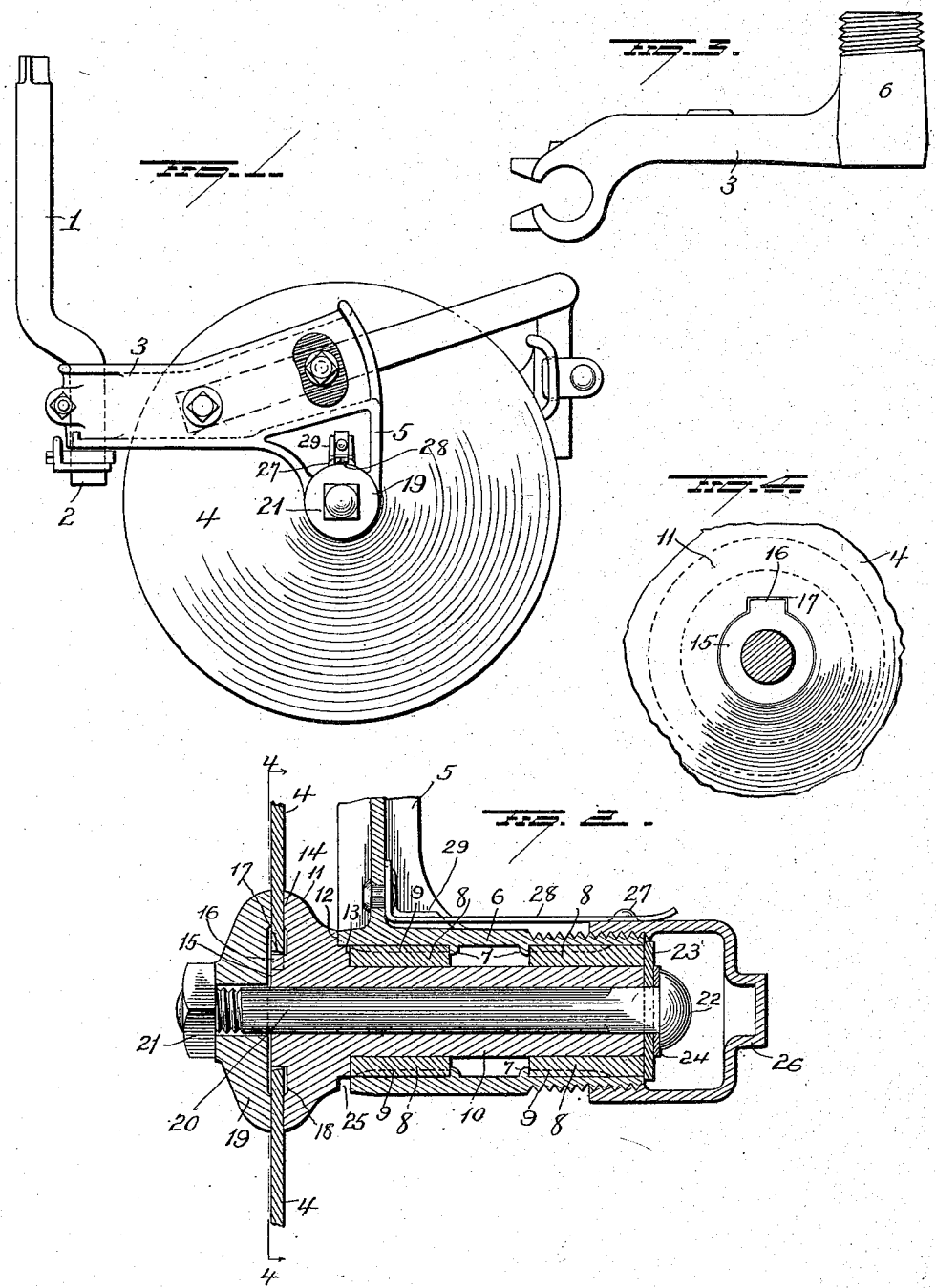

EDWARD M. HEYLMAN, OF SOUTH BEND, INDIANA, ASSIGNOR TO OLIVER CHILLED PLOW WORKS, OF SOUTH BEND, INDIANA.

BEARING DEVICE.

1,174,416. Specification of Letters Patent. Patented Mar. 7, 1916.

Original application filed February 2, 1915, Serial No. 5,672. Divided and this application filed June 3, 1915. Serial No. 31,937.

*To all whom it may concern:*

Be it known that I, EDWARD M. HEYLMAN, a citizen of the United States, and a resident of South Bend, in the county of St. Joseph and State of Indiana, have invented certain new and useful Improvements in Bearing Devices; and I do hereby declare the following to be a full, clear, and exact description of the invention, such as will enable others skilled in the art to which it appertains to make and use the same.

This invention relates to improvements in rolling colters and more particularly to improved bearing devices therefor,—this application being a division of application filed by me on the 2d day of February, 1915, and designated by Serial No. 5,672.

The object of my present invention is to so mount a rolling colter that an extended bearing shall be provided and so that the colter will be maintained in true working position at all times.

With this and other objects in view, the invention consists in certain novel features of construction and combinations of parts as hereinafter set forth and pointed out in the claims.

In the accompanying drawings, Figure 1 is an elevation showing an embodiment of my invention; Fig. 2 is a sectional view; Fig. 3 is a bottom plan view showing arm 3 and bearing box or barrel 19, and Fig. 4 is a view on the line 4—4 of Fig. 2.

1 represents a vertically disposed standard, which may be secured to a plow in any suitable manner, and is provided at its lower end with a crank 2, to which an arm 3 for carrying a rolling colter 4, is secured. In order that the arm 3 may more effectually withstand the lateral or torsional strains to which it may be subjected, it may be made hollow. The arm 3 may be curved laterally at its forward end and at its rear end, it is made with a depending flange or web 5, which latter is provided with a bearing box or barrel 6. This bearing box may be made integral with the flange of arm 3 and is provided interiorly with shoulders 7 against which the inner ends of wooden bushings 8 abut,—said bushings being prevented from rotation by means of V-shaped keys 9 within the bearing box. A tubular spindle 10 mounted in the bearing box, is revoluble within the wooden bushings, and is provided at one end with a head 11 having a shoulder 12 to bear against one end of the bearing box and a shoulder 13 to engage one end of the adjacent wooden bushing 8. The outer face 14 of the head 11 is machine finished and the colter blade 4 rests against this face,—a central boss 15 on said head entering a central hole in the colter and this boss is provided with a key 16 to enter a notch 17 in the colter to prevent the same from turning. A groove 18 is formed around the boss 15 so that the face 14 can be machine finished without interfering with the key 16. A cap 19 engages the opposite face of the colter disk and is perforated for the passage of a bolt 20. This bolt also passes through the tubular spindle 10 and is threaded at one end to receive a nut 21 which bears against the cap 19. The other end of the bolt 20 is made with a head 22. A washer 23 engages the end of the spindle and the end of the bearing box and between this washer and the head 22 of bolt 20 a disk or washer 24 (which may be made of card board) is placed to make a tight joint and prevent grease from being forced between the hole in the spindle and the bolt. The spindle is made with a finished surface to insure its true running and by providing a finished face 14 against which the colter disk bears, the true running of the colter is insured.

The end of the bearing box 6 nearest the head of the spindle, is cut-away as at 25 to permit the discharge of dirt which might find its way between the bearing box and the spindle. The outer end of the bearing box 6 is threaded exteriorly for the accommodation of a grease cap 26. This cap is provided exteriorly with beveled lugs 27, either of which may be engaged by a spring 28 to prevent said cap from turning. The spring 28 is secured to the depending flange 5 of arm 3 and said flange and the bearing box 6 are provided at each side of the spring with ribs 29 to retain said spring in position parallel with the bearing box over which it projects. It will be observed that by curving the forward end of the arm 3 laterally and mounting the colter disk as above explained, the connection of said arm with the standard will be in line with the colter disk.

Having fully described my invention what I claim as new and desire to secure by Letters-Patent, is:—

1. The combination with a standard, of an approximately horizontal arm attached thereto, a bearing box integral with said arm, bushings in said box, keys integral with the box for retaining said bushings from rotation, a spindle rotatable in said bushings and having a head, a disk bearing against said head, a cap bearing against the disk, a headed bolt passing through the cap and spindle, and a nut on said bolt.

2. The combination with an arm and a bearing box integral therewith, of a tubular spindle passing through said bearing box, said spindle having a head provided with a central boss, a disk bearing against said head and having a hole to receive said boss, a key on said boss, the disk having a slot to receive said key, a cap bearing against the disk and means for securing said cap to clamp the disk to the head on the spindle.

3. The combination with an arm and a bearing box fixed thereto, of a spindle mounted in said bearing box, a head on said spindle, and a disk secured to the spindle head, the lower portion of said bearing box being cut-away at one end to form a recess between the spindle head and bearing box for the escape of dirt.

4. The combination with an arm and a bearing box having a threaded end, of a spindle mounted in said bearing box, a disk secured to said spindle, a grease cap on the threaded end of the bearing box and having exterior lugs, a spring secured to said arm for engagement by the lugs on the grease cap, and ribs on the arm at respective sides of said spring.

5. The combination with a bearing box, bushings in said box, keys in said box for retaining said bushings from rotation, a spindle rotatable in said bushings and having a head, a disk bearing against said head, a cap bearing against the disk, a headed bolt passing through the cap and spindle, and a nut on said bolt.

In testimony whereof, I have signed this specification in the presence of two subscribing witnesses.

EDWARD M. HEYLMAN.

Witnesses:
EDWIN NICAR,
CHAS. A. WEBSTER.

Copies of this patent may be obtained for five cents each, by addressing the "Commissioner of Patents, Washington, D. C."